June 17, 1969 H. REIMANN ET AL 3,450,015

APPARATUS FOR ELECTRONIC EXPOSURE CONTROL

Filed March 4, 1966

INVENTORS
HUBERTUS REIMANN
CHRISTIAN HESSE
BY
Young & Thompson
ATTORNEYS

3,450,015
APPARATUS FOR ELECTRONIC EXPOSURE CONTROL

Hubertus Reimann and Christian Hesse, Dresden, Germany, assignors to VEB Pentacon Dresden Kamera- und Kinowerke, Dresden, Germany Filed Mar. 4, 1966, Ser. No. 531,940
Int. Cl. G03b 9/64; G01j 1/46
U.S. Cl. 95—10
8 Claims

ABSTRACT OF THE DISCLOSURE

Apparatus for electronic exposure control in photographic cameras, in which both the exposure time and the duration of a delayed action, which can be switched on as desired, are electronically controlled. To form the delayed action period and the exposure time, use is made of one and the same electronic time switch. This switch is returned at the end of the delayed action time to its functional initial position and switched over to its exposure time formation function automatically.

*Background of invention*

The invention relates to an apparatus for electronic exposure control in photographic cameras, in which both the exposure time and the duration of a delayed action, which can be switched on as desired, are electronically controlled.

Known devices of this kind have delayed action switching systems in which use is made of a semistable trigger stage for the control of the exposure time. To enable the desired delayed action time to be selected in the case of self-portraits, use is made of a further delayed action switching system which is similar to the exposure time electronic system mentioned and sets the exposure time switching system in operation after the expiry of the delayed action time.

The drawback of this device resides in the fact that the expenditure on the apparatus involved is out of proportion to the purpose in view.

The purpose of the invention is to provide a device for electronic exposure control, of the aforementioned kind, but only involving very limited extra input of apparatus by comparison with a time determining electronic system without delayed action, due account being taken, in its construction, of the fact that the capacity of a camera for accommodating additional devices is invariably very limited.

*Summary of invention*

The invention achieves this object by a system in which, to form the delayed action period and the exposure time, use is made of one and the same electronic time switch and this latter is returned at the end of the delayed action time to its functional initial position and switched over to its exposure time formation function automatically. The changeover from delayed action to exposure is brought about by means of switch contacts which, after the end of the delayed action time, are actuated by the time switch and bridge the charging condenser of a resistance-capacitance element of the circuit as well as connecting an exposure time determining resistance to it. The switch contacts are preferably actuated by a mechanical element of the camera, which element, in the process of selecting the delayed action, is electro-magnetically blocked for the duration of the latter. In one version of the invention the said mechanical element in a so-called single lens reflex camera is formed by the mirror drive mechanism of the camera.

The electronic time switch consists, inter alia, of an oscillator of which the retardable oscillation build-up is governed by the variable base biasing voltage of the oscillator transistor as well as by the resistance associated with the charging condenser in the setting of the delayed action or in that of the exposure time as the case may be. The oscillator is followed by a switching stage of which the working resistances are formed by the electro-magnet for the mirror drive as well as by a further electro-magnet which releases the shutter element which follows up, these devices coming into operation in succession when the delayed action mechanism is switched on.

The invention will be described below in greater detail in conjunction with constructional examples with reference to the accompanying drawings in which.

Figure 1:
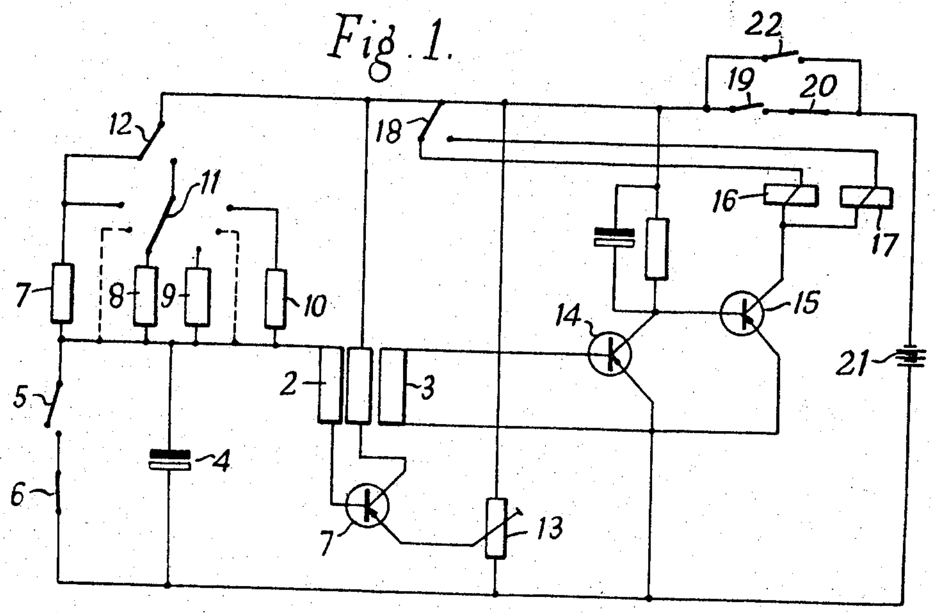
FIGURE 1 is an over-all circuit diagram of the electronic time switch.

A transformer has a first secondary winding 2, connected with the base circuit of the transistor 1, its second secondary winding 3 forming the input of a switching stage. The base circuit includes a charging condenser 4 with which are connected, in parallel, a switch contact 5, operated by a mirror drive, as well as a switch contact 6, operated by a first running out locking element, such as the first curtain of a slotted shutter. Connected in series with the charging condenser 4 are ohmic resistances 7, 8, 9 and 10, a manual selector switch 11 being provided to enable connection to be established between the said resistances and a switch contact 12 controlled by the mirror drive. The base biasing voltage of the oscillator transistor 1 can be adjusted by means of a variable resistance 13. The switching stage already mentioned is formed by a transistor 14 as well as a transistor 15. The working resistances of the latter are formed by an electro-magnet 16, for the mirror drive, which is not shown in the drawings, as well as an electro-magnet 17, for the second curtain of the shutter. Both electro-magnets can be subjected to a voltage source 21 via a switch contact 18, as well as a switch contact 19, these likewise being operated by the mirror drive, and also via a switch contact 20 controlled by the second curtain. Connected in parallel with the last two switch contacts mentioned is a switch contact 22 which, when the delayed action is required, can be operated by means of the release device of the camera.

Figure 2:
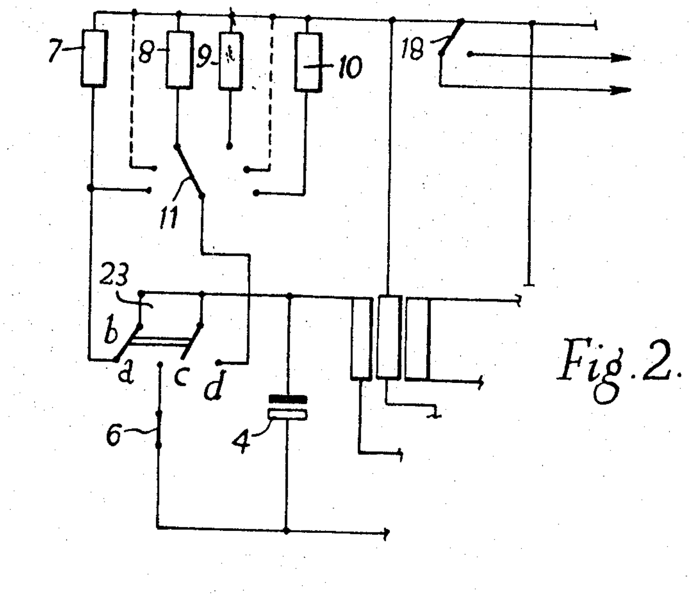
FIGURE 2 is an alternative version of the input part of the electronic time switch.
Figure 3:
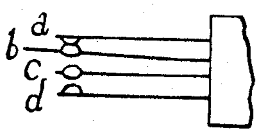
FIGURE 3 shows the switch contacts controlled by mirror drives.

The example shown in FIGURE 2 only differs from that described above in that, apart from the different arrangement of the resistances, the switch contacts 5 and 12 are replaced by a switch 23 which, again, is operated by the mirror drive of the camera, and which is once again shown separately in FIGURE 3.

The method of operation is as follows:

If the shutter is to be operated without delayed action, then the switch contact 22 is not closed when the release device, not shown in the drawing, is operated, owing to its special position. Shortly before the maximum stroke of the release device is reached, the mirror drive, likewise not shown, is mechanically released, so that the switch contact 5, still without current, is closed, the switch contacts 18 and 12 being caused to contact the electro-magnet 17 and the selector switch 11 respectively. The electronic time switch is thus prepared for the operation of selecting the exposure time. The zone of the run-out movement of the mirror drive also includes the switch contact 19, which is now closed. The electromagnet 17 consequently exerts its attraction, for the second curtain, and prevents it from running its course, so that the hitherto operative mechanical blocking system for the second curtain can be released by the mirror drive. This latter also releases the first curtain, enabling it to run its course. In its motion, the first curtain, by opening the switch contact 6, nullifies the short-circuiting of the charging condenser 4, so that the latter can become charged up via a resistance corresponding to the preselected exposure time, such as resistance 8. As soon as the condenser potential has reached a value assigned by the base biasing voltage of the oscillator transistor 1, by which value is the oscillator blocked, the oscillation of the latter begins to build up. This commencement of oscillation constitutes the switching impulse for the electro-magnet 17 by which the exposure is terminated, in that part of the oscillation energy is coupled, via the secondary winding 3, to the base of the transistor 14, amplified by the latter and then conveyed to the live transistor 15. This causes the closing of the transistor 15, which was open until the commencement of the oscillation, and deprives the electro-magnet 17 of current, so that the second curtain is released and the exposure terminated. Shortly before the termination of the movement of the second curtain, the switch contact 20 is opened by the latter and the time switching system separated from the voltage source. On the re-cocking of the shutter all the switches return to the position of rest shown in the drawing.

Function of switches with delayed action:

As already mentioned, the release device of the camera is at the same time constructed as a selector switch for operating the shutter with or without delayed action. If delayed action is required the release device is rotated into a position in which it will now close the switch contact 22, if it is operated, during the first phase of its stroke. This ensures that the electro-magnet 16 will exert its attraction, via the live transistor 15, and prevent the mirror drive from running its course when the release knob is pressed in still further. The release knob can be blocked in the final position into which it has been pressed. Since, owing to the fact that the mirror drive is blocked, switch contact 5 likewise remains open, the charging condenser 4 is able to charge up via the delayed action resistance 7, the switch contact 12 and the closed switch contact 22. The duration of the charging operation corresponds to the desired delayed action time and is governed by the magnitude of the resistance fed in by 7. As soon as the condenser potential has again reached a value governed by the base biasing voltage, the oscillator responds the transistor 15 is blocked. The electro-magnet 16 thus drops away, and the mirror drive is released for action. Its motion causes inter alia, the closing of the switch contact 5. The condenser 4 is discharged via this latter, the oscillator thus being blocked. The electronic time switch has thus once again been returned to its functional initial position, i.e. the oscillator transistor 1 is blocked, as at the beginning, and the transistor 15 again carries current. Since, at the same time, the switch contact 12 has been caused to contact a time determining resistance preselected by means of the selector switch 11, and the switch contact 18 has been caused to contact the electro-magnet 17, the electronic time switch, which has hitherto been utilized for forming the delayed action, can now be utilized for forming the exposure time likewise. This latter commences as soon as the switch contact 6 is opened by the first curtain, which is released by the mirror drive as the latter runs its course. The further sequence of movements is the same as when the shutter is operated without delayed action, as described above.

The same functional sequences occur in the example shown in FIGURE 2, in which the switchover of the time determining resistances and the return of the oscillator to its blocked state are effected by means of a common switch 23 embracing a number of contacts.

The invention is naturally not confined to a camera with a slotted shutter or to mirror reflex cameras. On the contrary, it can also be used in conjunction with an inter-lens shutter. The time determining resistances can also be arranged in such a way that a number of the exposure time resistances can be utilized for determining the delay action time, so that the latter is variable. In place of the ohmic resistances for the exposure time, use can be made of a photo-electric resistance, so that the exposure time is formed automatically after the necessary exposure factors have been fed in.

We claim:

1. In a photographic camera having a shutter, a shutter drive mechanism and release mechanism therefor, the provision of an exposure time and delayed action control circuit having:

(a) a source of electrical energy, (b) a first electromagnetic means which when energised prevents the actuation of said shutter drive mechanism until deenergised, (c) a first switch in series with first electromagnetic means closeable by said release mechanism in the selected case of delayed action, (d) a second electromagnetic means which when energised retains the shutter drive mechanism in the open position, (e) a second switch connected in series with the first switch, (f) an electronic switch for actuating and energising first or second electromagnetic means dependent on the position of said second switch, connected to the first switch and actuated by the shutter drive mechanism during the opening of the shutter, enabling first and second switches, the electronic switch and either first or second electromagnetic means to be connected in series across the source, the changeover of connection from first to second electromagnetic means being initiated by the shutter drive mechanism as the shutter opens, (g) an oscillator circuit coupled to the electronic switch which triggers the latter when the oscillator circuit is in oscillation, (h) a resistance capacitance exposure timing network providing as the capacitor charges an increasing bias voltage, said bias voltage being utilised to initiate the operation of said oscillator circuit, (i) an additional resistor for controlling the delayed action time of the circuit in conjunction with the capacitance of said resistance capacitance exposure timing network, and (j) a third switch having its wiper connected to the junction of first and second switches and actuated by the shutter drive mechanism, said third switch being normally connected to the delayed action, timing resistor said resistor being in series with said capacitor, the operation of the shutter drive mechanism disconnecting the wiper from said delayed action timing resistor and connecting it to said exposure timing network.

2. An exposure time and delayed action control circuit according to claim 1, wherein there is provided:

(a) a fourth switch closed by the initial movement of the said shutter drive mechanism that discharges the said capacitor before the operation of the exposure timing circuit, and (b) a fifth switch in series with said fourth switch this series network being connected in parallel with said capacitor, the fourth switch being closed until opened by the shutter drive mechanism after the closure of the fourth switch allowing the capacitor to charge.

3. An exposure time and delayed action control circuit according to claim 2, having switching means for the selection of delayed action enabling the camera to be used with or without delayed action, wherein there is provided:

(a) a sixth switch being closed by the initial movement of said shutter drive mechanism, and (b) a seventh switch opened by the operation of said shutter drive mechanism when shutter closes and connected in series with said sixth switch, this series arrangement being connected in parallel with said first switch, said series arrangement being functional in the case where delayed action is not selected, when said first switch is no longer closed by the operation of said release mechanism.

4. An exposure time and delayed action circuit according to claim 3, wherein said first switch closeable by said release mechanism in the selected case of delayed action is incorporated as an integral part of said release mechanism.

5. An exposure time and delayed action circuit according to claim 4, wherein there is provided a resistance capacitance exposure timing circuit including:

(a) a series of exposure time control resistors connected to said capacitor of the said resistance capacitance exposure timing network, and (b) an eighth switch having a wiper by which any of the said series of resistors may be selected to allow the camera to be preset to a required exposure time.

6. An exposure time and delayed action circuit according to claim 5, wherein a combination of said exposure time control resistors are interconnected to determine a resistance value for the delayed action time.

7. An exposure time and delayed action circuit as claimed in claim 4, having a photo-electric resistance which after the necessary exposure determining factors have been fed into the camera controls the exposure time automatically dependent on the level of scene brightness.

8. An exposure time and delayed action circuit according to claim 7, for use in a so-called single lens reflex camera having a mirror drive mechanism operated by the shutter release mechanism wherein the said second, third, fourth and sixth switches are actuated by the mirror drive mechanism.

References Cited

UNITED STATES PATENTS

| | | | |
|---|---|---|---|
| 3,063,354 | 11/1962 | Matulik et al. | 95—10 |
| 3,200,723 | 8/1965 | Topaz | 95—10 |
| 3,205,799 | 9/1965 | Burgarella et al. | 95—10 |
| 3,205,803 | 9/1965 | Burgarella et al. | 95—10 |

NORTON ANSHER, *Primary Examiner.*

J. F. PETERS, *Assistant Examiner.*

U.S. Cl. X.R.

95—53.3; 317—124